US011198433B2

(12) United States Patent
Lee

(10) Patent No.: US 11,198,433 B2
(45) Date of Patent: Dec. 14, 2021

(54) APPARATUS, METHOD AND SYSTEM FOR AUTONOMOUS DRIVING

(71) Applicant: HYUNDAI MOBIS CO., LTD., Seoul (KR)

(72) Inventor: Joo Yeob Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/058,954

(22) Filed: Aug. 8, 2018

(65) Prior Publication Data

US 2019/0084560 A1 Mar. 21, 2019

(30) Foreign Application Priority Data

Sep. 15, 2017 (KR) .................. 10-2017-0118395
Dec. 8, 2017 (KR) .................. 10-2017-0168690

(51) Int. Cl.
*B60W 30/095* (2012.01)
*G08G 1/16* (2006.01)
(Continued)

(52) U.S. Cl.
CPC ........ *B60W 30/0956* (2013.01); *B60W 30/09* (2013.01); *B60W 30/0953* (2013.01); *G05D 1/0088* (2013.01); *G05D 1/0212* (2013.01); *G05D 1/0238* (2013.01); *G08G 1/0112* (2013.01); *G08G 1/166* (2013.01); *G05D 2201/0213* (2013.01)

(58) Field of Classification Search
CPC ............. B60W 30/0956; B60W 30/09; B60W 30/0953; G05D 1/0088; G05D 1/0212; G05D 1/0238; G05D 2201/0213
See application file for complete search history.

(56) References Cited

U.S. PATENT DOCUMENTS 10,012,991 B1 * 7/2018 Ferguson ................. B62D 1/00
10,134,278 B1 * 11/2018 Konrardy ......... G08G 1/096791
(Continued)

FOREIGN PATENT DOCUMENTS

CN 106184217 3/2009
CN 101395647 12/2016
(Continued)

OTHER PUBLICATIONS

Office Action dated Jun. 30, 2021, issued in Korean Patent Application No. 10-2017-0118395.

*Primary Examiner* — Yazan A Soofi
*Assistant Examiner* — Naeem Taslim Alam
(74) *Attorney, Agent, or Firm* — H.C. Park & Associates, PLC

(57) ABSTRACT

An autonomous driving device may include: a sensor configured to sense a surrounding object of an own vehicle, a controller configured to generate an autonomous driving path of the own vehicle based on movement data of the surrounding object sensed by the sensor unit, and a surrounding object analyzer configured to receive the movement data of the surrounding object from the controller and stochastically analyze an expected movement trajectory of the surrounding object. The controller may generate the autonomous driving path based on the expected movement trajectory of the surrounding object that is stochastically analyzed by the surrounding object analyzing unit.

4 Claims, 14 Drawing Sheets

(51) Int. Cl.
    *B60W 30/09*    (2012.01)
    *G05D 1/00*     (2006.01)
    *G05D 1/02*     (2020.01)
    *G08G 1/01*     (2006.01)

(56) References Cited

U.S. PATENT DOCUMENTS

| | | | |
|---|---|---|---|
| 10,286,913 B2 * | 5/2019 | Saigusa | B60W 30/10 |
| 10,793,162 B2 | 10/2020 | Yoon | |
| 2010/0057361 A1 * | 3/2010 | Caveney | B60W 50/0097 |
| | | | 701/301 |
| 2014/0236414 A1 | 8/2014 | Droz et al. | |
| 2014/0278052 A1 * | 9/2014 | Slavin | G08G 1/0129 |
| | | | 701/400 |
| 2017/0212518 A1 * | 7/2017 | Iimura | G06K 9/00664 |
| 2017/0301239 A1 | 10/2017 | Lee et al. | |
| 2017/0357862 A1 * | 12/2017 | Tatsubori | G08G 1/04 |
| 2018/0032082 A1 * | 2/2018 | Shalev-Shwartz | G06N 7/005 |
| 2018/0086336 A1 * | 3/2018 | Jones | B60W 30/09 |
| 2018/0141544 A1 * | 5/2018 | Xiao | G08G 1/164 |
| 2018/0141545 A1 * | 5/2018 | Freytag | B60W 30/095 |
| 2019/0324150 A1 * | 10/2019 | Konschak | G01S 19/41 |

FOREIGN PATENT DOCUMENTS

| | | |
|---|---|---|
| JP | 2009-157499 | 7/2009 |
| JP | 4396653 | 1/2010 |
| JP | 2017-215759 | 12/2017 |
| KR | 10-1998-0068399 | 10/1998 |
| KR | 10-2015-0108891 | 9/2015 |
| KR | 10-1714250 | 3/2017 |
| KR | 10-2017-0044940 | 4/2017 |
| KR | 10-2017-0083233 | 7/2017 |
| KR | 10-2017-0118501 | 10/2017 |

* cited by examiner (a)            (b)

APPARATUS, METHOD AND SYSTEM FOR AUTONOMOUS DRIVING

CROSS-REFERENCES TO RELATED APPLICATIONS

This application claims priority from and the benefit of Korean Patent Applications No. 10-2017-0118395 and 10-2017-0168690, filed on Sep. 15, 2017 and Dec. 8, 2017, respectively, which are hereby incorporated by reference for all purposes as if set forth herein.

BACKGROUND

Field

Exemplary embodiments of the invention relate to an apparatus, method and system for autonomous driving, and more particularly, to an apparatus, method and system for autonomous driving which perform autonomous driving along an autonomous driving path generated to avoid a collision with a surrounding object.

Discussion of the Background

Today's automotive industry is proceeding toward a direction of realizing autonomous driving through which driver's intervention in driving is minimized. An autonomous driving vehicle indicates a vehicle that recognizes surrounding environments through a sensing and processing function, autonomously determines a path, and independently drives using own power.

Even though a driver does not manipulate a steering wheel, an acceleration pedal, or a brake, etc., the autonomous driving vehicle may drive itself to a destination, while preventing a collision with an obstacle existing on a path and adjusting a speed and driving direction according to a shape of the road. For example, the autonomous driving vehicle performs acceleration on a straight road, and deceleration on a curved road, while changing a driving direction in correspondence to a curvature of the road.

Such an autonomous driving vehicle performs autonomous driving in a process of following a path to an initially set destination, while avoiding a collision with a surrounding vehicle using sensor data acquired through a sensor mounted in the vehicle, or newly setting a path and amending an initially set path through vehicle-to-everything (V2X) communication. However, the autonomous driving based on the vehicle-mounted sensor has a limitation in that the preciseness decreases due to a systematic limit of the sensor, and accuracy of the autonomous driving path obtained through communication decreases due to non-up-to-date (non-up-to-date of map data, etc.) of communication information.

The background technology of the invention is disclosed in Republic of Korea Patent Application Publication No. 10-1998-0068399 (disclosed on Oct. 15, 1998).

The above information disclosed in this Background section is only for enhancement of understanding of the background of the invention and, therefore, it may contain information that does not constitute prior art.

SUMMARY

Exemplary embodiments of the invention are directed to an apparatus, method and system for autonomous driving which improve a limitation of reduction in preciseness of an autonomous driving control, when the preciseness is reduced by performing autonomous driving only through sensor data measured through a vehicle-mounted sensor, and improve inaccuracy of the autonomous driving path due to non-up-to-date of communication information to enhance autonomous driving control performance.

In an embodiment, an autonomous driving device of a vehicle includes: a sensor configured to sense a surrounding object of near the vehicle; a controller configured to generate an autonomous driving path of the own vehicle based on movement data of the surrounding object generated by the sensor; and a surrounding object analyzer configured to receive the movement data of the surrounding object from the controller and to stochastically analyze an expected movement trajectory of the surrounding object, wherein the controller generates the autonomous driving path based on the stochastically analyzed expected movement trajectory of the surrounding object.

The movement data of the surrounding object may be object attribute data comprising one or more of an object type, a movement speed, acceleration/deceleration information, lane change frequency information and lane compliance information.

The surrounding object analyzer may be configured to receive the movement data of the surrounding object, and stochastically analyze the expected movement trajectory of the surrounding object based on pre-stored big data to which reference information of the movement data is reflected according to object attributes.

The controller may be configured to determine an expected movement path of the surrounding object based on the movement data of the surrounding object and the expected movement trajectory of the surrounding object, and to update the autonomous driving path of the vehicle based on the determined expected movement path of the surrounding object.

The autonomous driving device may include an autonomous driver configured to perform one or more of driving, steering, and braking of the vehicle to follow the generated autonomous driving path.

In another embodiment, a method of autonomously driving a vehicle includes the steps of: sensing, by a sensor, a surrounding object of the vehicle; generating, by a controller, an autonomous driving path of the vehicle based on movement data of the surrounding object generated by the sensor; receiving, by a surrounding object analyzer, the movement data of the surrounding object from the controller and stochastically analyzing an expected movement trajectory of the surrounding object; and updating, by the controller, the autonomous driving path based on the movement data of the surrounding object and the stochastically analyzed expected movement trajectory of the surrounding object.

The movement data of the surrounding object may be object attribute data comprising one or more of an object type, a movement speed, acceleration/deceleration information, lane change frequency information and lane compliance information.

In the step of receiving and the analyzing, the surrounding object analyzer may receive the movement data of the surrounding object, and stochastically analyzes the expected movement trajectory of the surrounding object based on pre-stored big data to which reference information of the movement data is reflected according to object attributes.

In the step of updating, the controller may determine an expected movement path of the surrounding object based on the movement data of the surrounding object and the expected movement trajectory of the surrounding object, and updates the autonomous driving path based on the determined expected movement path of the surrounding object.

The method of autonomously driving a vehicle may include controlling, by the controller, one or more of driving, steering, and braking of the vehicle to follow the updated autonomous driving path.

In another embodiment, an autonomous driving device of a vehicle includes: a sensor configured to sense a surrounding object near the vehicle and a driving environment information of the vehicle; a controller configured to generate an autonomous driving path of the vehicle based on movement data and driving environment information of the surrounding object generated by the sensor; and a data analyzer configured to stochastically analyze an expected movement trajectory of the surrounding object based on the movement data of the surrounding object that is received from the controller, and to analyze accident data corresponding to the driving environment information received from the control unit, wherein the controller is configured to optimize the autonomous driving path based on the stochastically analyzed expected movement trajectory of the surrounding object and the analyzed accident data.

The driving environment information may include one or more of driving road information, driving area information, and driving time information on the vehicle.

The data analyzer may be configured to analyze the accident data corresponding to the driving environment information received from the controller based on pre-stored big data to which accident data for each driving environment is reflected.

The controller is configured to determine an expected movement path of the surrounding object based on the movement data of the surrounding object and the expected movement trajectory of the surrounding object, and to optimize the autonomous driving path by reflecting the accident data in determining the expected movement trajectory of the surrounding object.

In another embodiment, an autonomous driving method of a vehicle includes: sensing, by a sensor, a surrounding object and a driving environment of the vehicle; generating, by a controller, an autonomous driving path for the vehicle based on movement data and driving environment information of the surrounding object generated by the sensor; receiving, by a data analyzer, the movement data of the surrounding object from the controller, stochastically analyzing an expected movement trajectory of the surrounding object, and analyzing an accident data corresponding to the driving environment information; and optimizing, by the controller, the autonomous driving path based on the stochastically analyzed expected movement trajectory of the surrounding object and the accident.

The driving environment information may include one or more of driving road information, driving area information, and driving time information of the vehicle.

In the step of analyzing of the accident data, the data analyzer may be configured to analyze the accident data corresponding to the driving environment information received from the controller based on pre-stored big data to which accident data for each driving environment is reflected.

In the step of optimizing, the controller may be configured to determine an expected movement path of the surrounding object based on the movement data of the surrounding object and the expected movement trajectory of the surrounding object, and to optimize the autonomous driving path by reflecting the accident data analyzed by the data analyzer to the expected movement trajectory of the surrounding object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
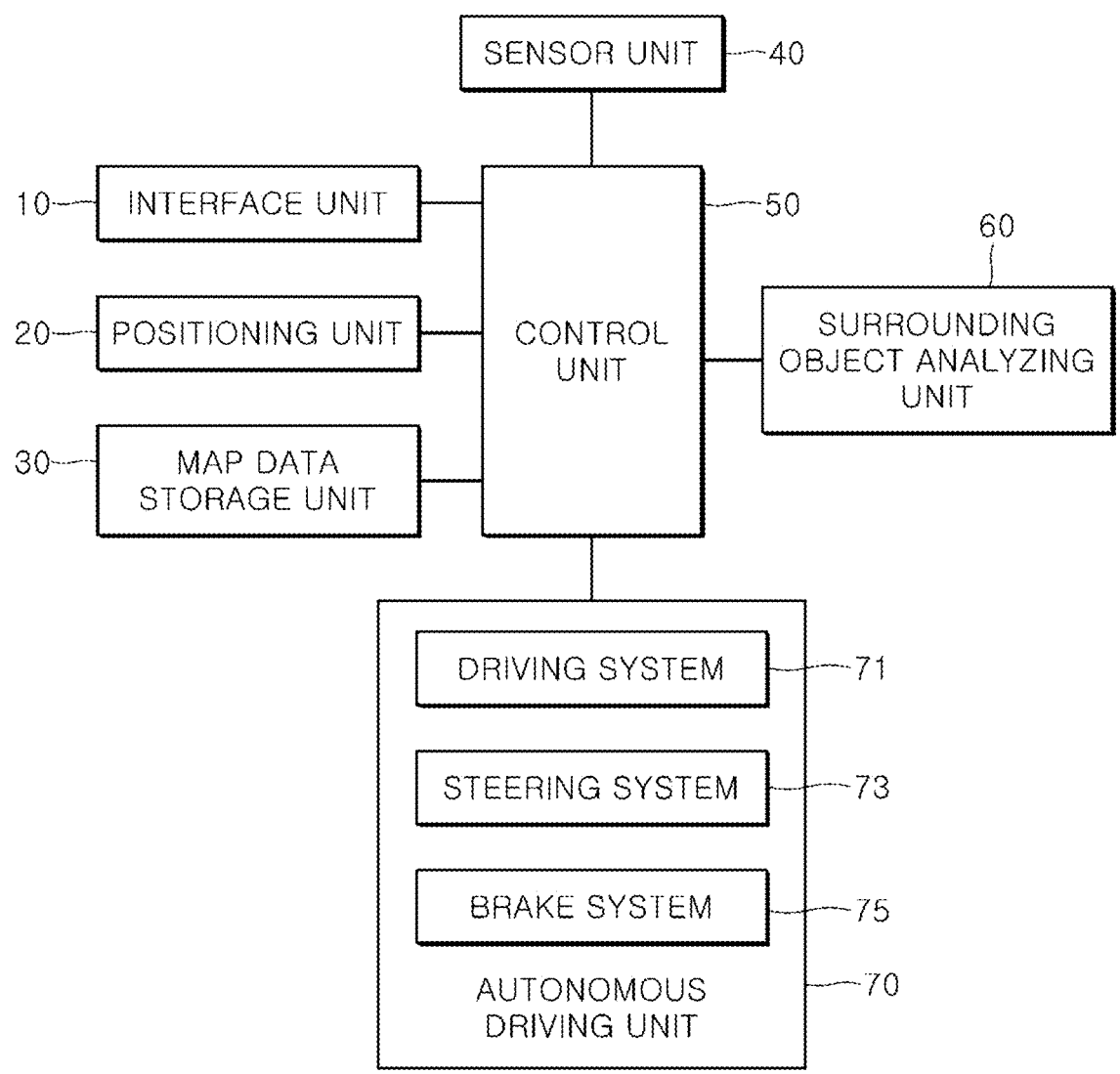
FIG. 1 is a block configuration diagram for describing an autonomous driving control device according to a first embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Embodiment 1

Figure 2:
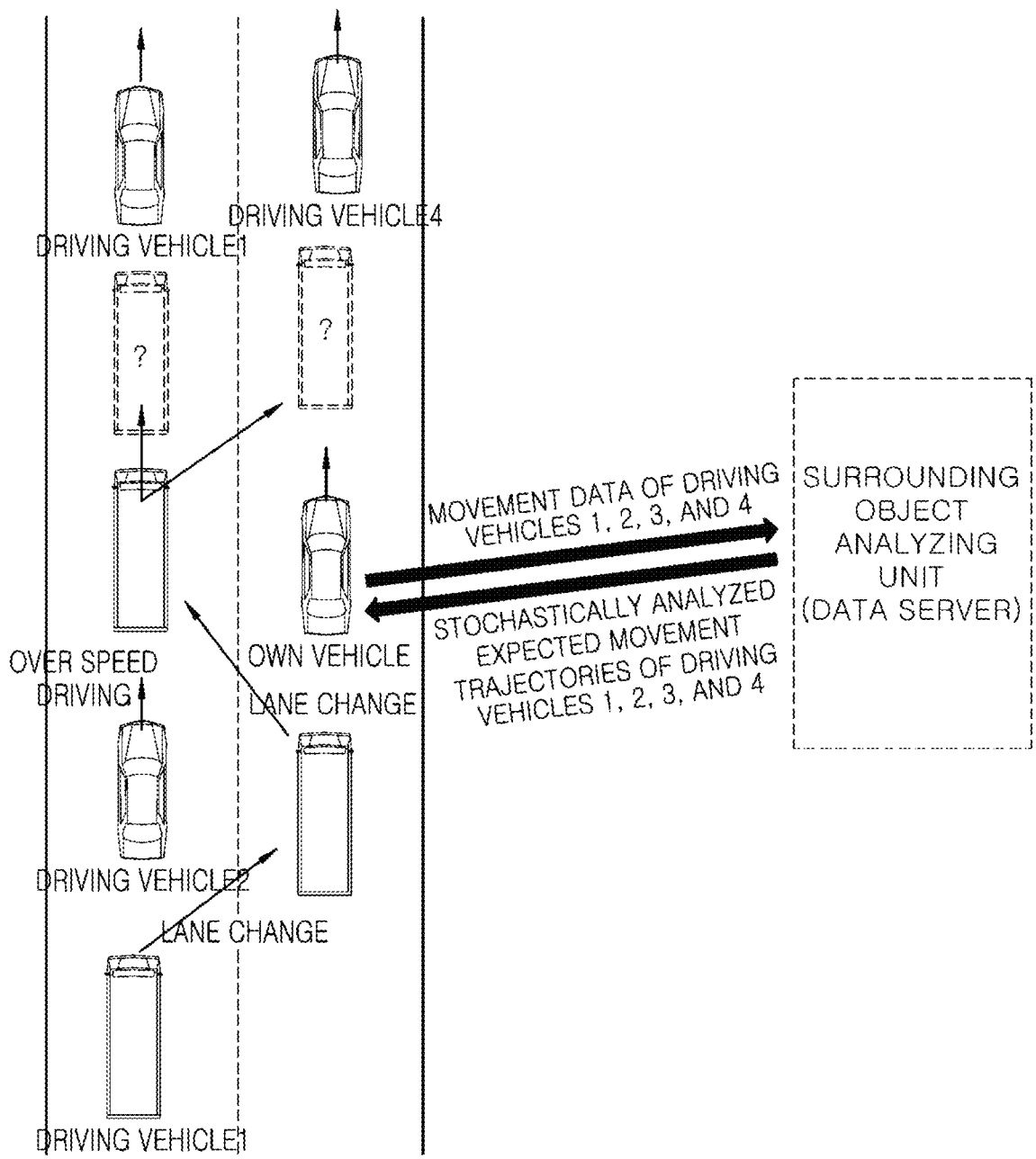
FIGS. 2 and 3 are exemplary drawings for describing a process in which a surrounding object analyzing unit analyzes movement data of a surrounding object in the autonomous driving control device according to the first embodiment of the invention.
Figure 3:
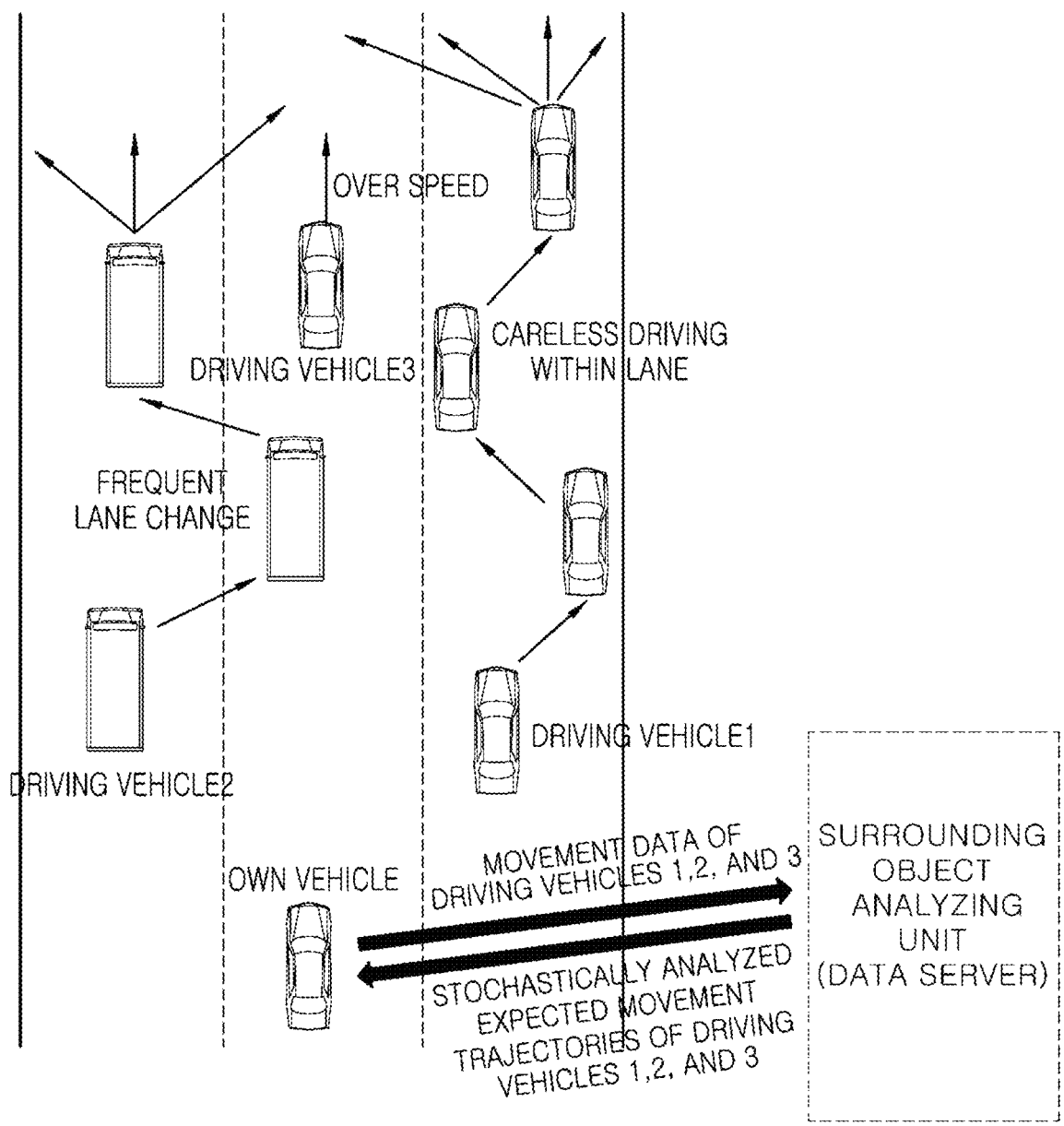

FIG. 1 is a block configuration diagram for describing an autonomous driving control device according to a first embodiment of the invention, and FIGS. 2 and 3 are exemplary drawings for describing a process in which a control unit in the autonomous driving control device generates an autonomous driving path according to the first embodiment of the invention.

In relation to FIG. 1, the autonomous driving control device according to a first embodiment of the invention may include an interface unit 10, a positioning unit 20, a map data storage unit 30, a sensor unit 40, a control unit 50, a surrounding object analyzing unit 60, and a autonomous driving unit 70.

The interface unit 10 performs an input/output function for receiving a manipulation of a user and outputting driving information of an own vehicle, etc., and may include all components capable of performing an input/output function, such as a voice recognition device and 3D hologram as well as a head up display (HUD), a cluster, and a button.

The positioning unit 20 may measure a current position of the own vehicle. In detail, the positioning unit 20 may receive GPS coordinates with respect to a current position of the vehicle, that is, position information of latitude and longitude coordinates using a satellite position system such as GPS.

The map data storage unit 30 stores map data for guiding a driving path obtained by searching for the driving path. The map data storage unit 30 may store not only information such as links of the driving path, attributes of each link, or a node list of crossroads for each link, but also width information and lane information on the driving road, or position, size and shape information on a fixed facility, etc.

The sensor unit 40 may sense a surrounding object of the own vehicle to deliver the sensed result to the control unit 50 to be described later. The sensor unit 40 may include all kinds of sensors mounted in the vehicle, and may include a camera sensor, a radar sensor, a lidar sensor, or an ultrasonic sensor, etc., for detecting the surrounding object of the own vehicle.

When receiving a destination from a user through the interface unit 10, the control unit 50 generates a path from the current position to the destination based on a current position of the own vehicle measured by the positioning unit 20 and the map data stored in the map data storage unit 30, and controls the autonomous driving unit 70 to perform autonomous driving on the own vehicle, while following the generated path.

On the other hand, the control unit in an embodiment may generate an autonomous driving path of the own vehicle based on movement data of a surrounding object which is sensed by the sensor unit 40. Here, the surrounding object includes all objects moving in the surroundings, such as a pedestrian, a bicycle, or an autobike as well as surrounding vehicles in the surroundings of the own vehicle. In addition, the movement data of the surrounding objects means object attribute data including one or more of an object type (an object type such as a car, a truck, a bus, a pedestrian, a bicycle, or an autobike), a movement speed, acceleration/deceleration information, lane change frequency information, and lane compliance information.

In other words, the control unit 50 may perform the autonomous driving of the own vehicle through a manner in which an autonomous driving path is generated in real time in order to avoid a collision with a surrounding object, while monitoring the surrounding object of the own vehicle through the sensor unit 40 during following the path to the destination.

However, when the autonomous driving is performed only based on the sensor mounted in the vehicle, there is a limitation in that preciseness of the autonomous driving is lowered due to systematic limitation of the sensor device. Thus, in the embodiment, a configuration is adopted which improves preciseness of autonomous driving by stochastically analyzing an expected movement trajectory of the surrounding object through the surrounding object analyzing unit 60 and reflecting the analyzed result to generating the autonomous driving path of the own vehicle.

The surrounding object analyzing unit 60 may receive the movement data of the surrounding object from the control unit 50 and stochastically analyze an expected movement trajectory of the surrounding object. At this point, the surrounding object analyzing unit 60 may receive the movement data of the surrounding object to stochastically analyze the expected movement trajectory of the surrounding object based on pre-stored big data to which reference information of the movement data is reflected according to the attributes of the object.

In detail, as described above, the movement data of the surrounding object received by analyzing unit 60 from the control unit 50 includes one or more of the object type, the movement speed, the acceleration/deceleration information, the lane change frequency information and the lane compliance information. In relation to the example illustrated in FIG. 2, the surrounding object analyzing unit 60 may determine a driving vehicle 1 to be a vehicle frequently changing a lane based on movement data thereof, determine a driving vehicle 2 to be a low speed driving vehicle based on movement data thereof, determine driving vehicles 3 and 4 to be vehicles moving in front of the own vehicle at a regular speed based on movement data thereof. Similarly, in relation to the example illustrated in FIG. 3, the surrounding object analyzing unit 60 may determine a driving vehicle 1 to be a vehicle driven carelessly within a lane based on movement data thereof, determine a driving vehicle 2 to be a vehicle frequently changing lane based on movement data thereof, and determine a driving vehicle 3 to be a high speed driving vehicle in the front of the own vehicle based on movement data thereof.

Accordingly, the surrounding object analyzing unit 60 may stochastically analyze an expected movement trajectory of the surrounding object based on movement data of the surrounding object received from the control unit 50, and at this point, the surrounding object analyzing unit 60 may stochastically analyze the expected movement trajectory of the surrounding object based on pre-stored big data to which reference information of the movement data is reflected according to the attributes of the object. The big data means a database of the reference information in which the movement data is collected according to attributes of the object (namely, the object type, the movement speed, the acceleration/deceleration information, the lane change frequency information and the lane compliance information). The movement trajectory of the corresponding surrounding object may be predicted from the movement data of the surrounding object in the database. Accordingly, the surrounding object analyzing unit 60 may apply a stochastic analysis scheme using the big data to the movement data of the surrounding object to stochastically analyze the expected movement trajectory.

On the other hand, in consideration of a calculation load of the big data-based stochastic analysis scheme, the surrounding object analyzing unit 60 may be also realized with a data server 60 communicating with the own vehicle outside the own vehicle as illustrated in FIGS. 2 and 3.

The surrounding object analyzing unit 60 may deliver the expected movement trajectory of the surrounding object that is stochastically analyzed, to the control unit 50, and thus the control unit 50 may generate the autonomous driving path based on the movement data of the surrounding object and the expected movement trajectory of surrounding object that is stochastically analyzed.

In other words, the control unit 50 may generate the autonomous driving path in consideration of the expected movement trajectory of the surrounding object that is stochastically analyzed based on the movement data of the surrounding object as well as the movement data of the surrounding object that is sensed by the sensor unit 40, and thus may improve a limitation that precision of autonomous driving is lowered due to a systematic limit of the sensor device, when the autonomous driving is performed only based on the sensor mounted in the vehicle.

At this point, the control unit 50 may finally determine an expected movement path of the surrounding object based on the movement data of the surrounding object and the expected movement trajectory of the surrounding object, and may generate the autonomous driving path of the own vehicle based on the determined expected movement path of the surrounding object. In other words, the control unit 50 may finally determine the expected movement path of the surrounding object based on the movement data of the surrounding object monitored in real time through the sensor unit 40 and the expected movement trajectory of the surrounding object stochastically analyzed by the surrounding object analyzing unit 60, and may generate the autonomous driving path so as to avoid a collision with the surrounding object based on the determined expected movement path. This process means to update the autonomous driving path that is generated only based on the movement data of the surrounding object, using the expected movement trajectory of the surrounding object.

The autonomous driving unit 70 may perform one or more of driving, steering and braking of the own vehicle so as to follow the autonomous driving path generated (updated) through the above-described process. In other words, the autonomous driving unit 70 may be controlled to follow the generated (updated) autonomous driving path by the control unit 50 and perform one or more of driving, steering and braking of the own vehicle. To this end, as illustrated in FIG. 1, the autonomous driving unit 70 may include a driving system 71 for driving an internal combustion engine, a steering system 73 such as Motor Driven Power Steering (MDPS), Active Front Steering (AFS), or Rear Wheel Steering (RWS), a brake system 75 such as Autonomous Emergency Braking (AEB) or Anti-lock Brake System (ABS).

Figure 4:
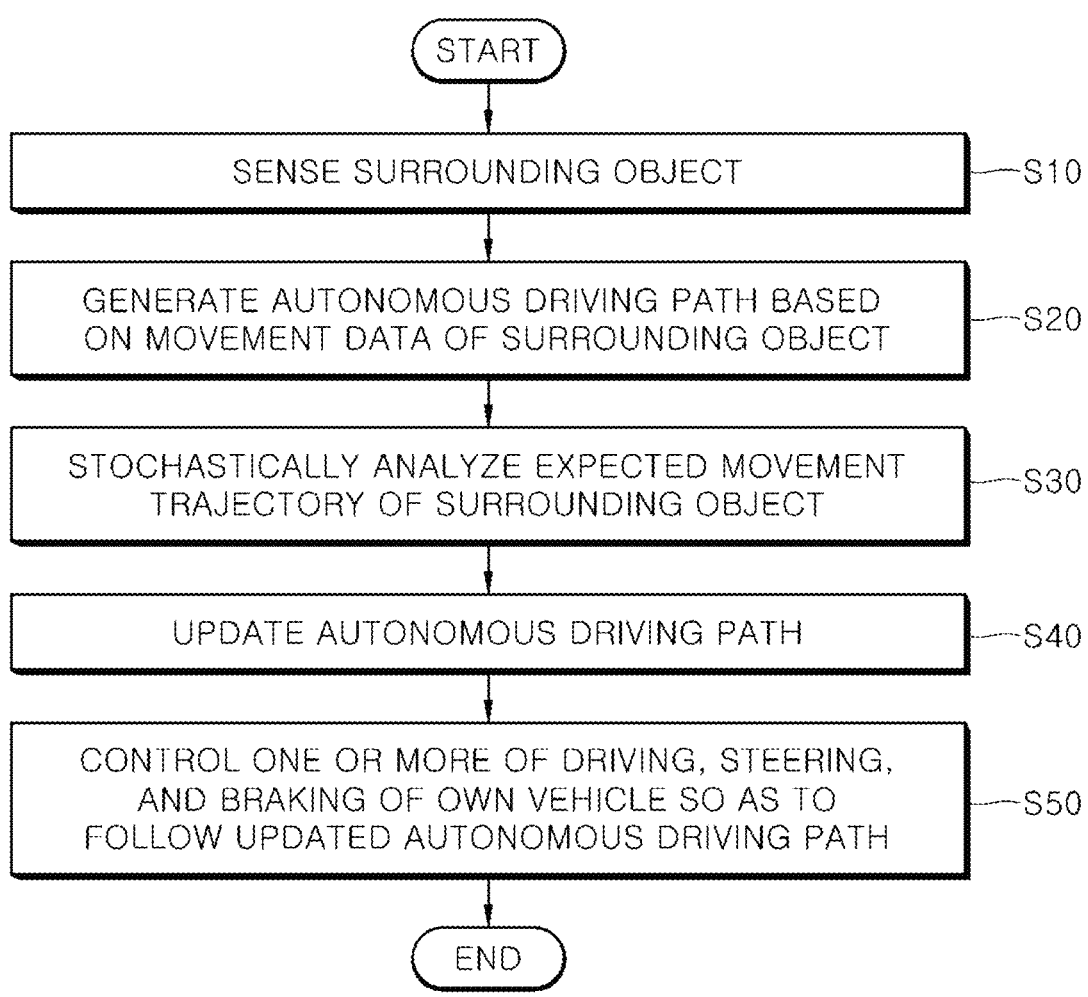
FIG. 4 is a flowchart for describing an autonomous driving method according to a first embodiment of the invention.

FIG. 4 is a flowchart for describing an autonomous driving method according to a first embodiment of the invention.

In description about the autonomous driving method according to the first embodiment of the invention, the sensing unit 40 senses the surrounding object of the own vehicle (operation S10). In operation S10, the sensing unit 40 may detect the surrounding object of the own vehicle through a camera sensor, a radar sensor, a lidar sensor, or an ultrasonic sensor, etc.

Then, the control unit 50 may generate an autonomous driving path of the own vehicle based on the movement data of the surrounding object that is sensed by the sensor unit 40. Here, the movement data of the surrounding object may include one or more of the object type, the movement speed, the acceleration/deceleration information, the lane change frequency information and the lane compliance information.

Then, the surrounding object analyzing unit 60 may receive the movement data of the surrounding object from the control unit 50 and stochastically analyze an expected movement trajectory of the surrounding object (operation S30). In operation S30, the surrounding object analyzing unit 60 may receive the movement data of the surrounding object to stochastically analyze the expected movement trajectory of the surrounding object based on pre-stored big data to which reference information of the movement data according to the attributes of the object is reflected.

Then, the control unit 50 updates the autonomous driving path generated in operation S20 based on the movement data of the surrounding object and the expected movement trajectory of the surrounding object that is stochastically analyzed by the surrounding object analyzing unit 60 (operation S40). In operation S40, the control unit 50 may finally determine the expected movement path of the surrounding object based on the movement data of the surrounding object and the expected movement trajectory of the surrounding object, and may update the autonomous driving path based on the determined expected movement path of the surrounding object.

Then, the control unit 50 controls one or more of driving, steering and braking of the own vehicle so that the own vehicle follows the updated autonomous driving path through the autonomous driving unit (operation S50).

Figure 5:
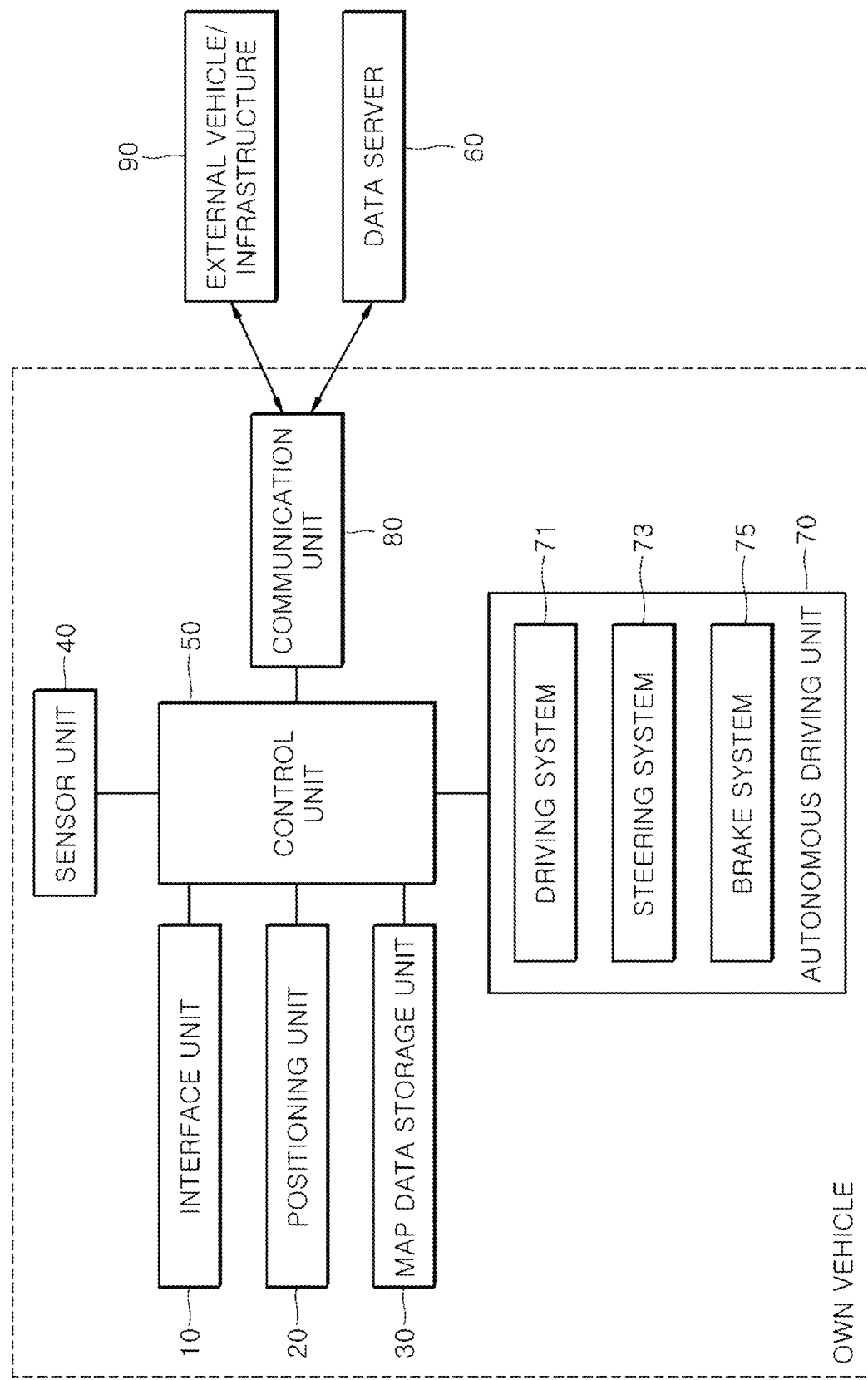
FIG. 5 is a block configuration diagram for describing an autonomous driving system according to a first embodiment of the invention.

On the other hand, in consideration of the calculation load of the big data-based stochastic analysis scheme, the surrounding object analyzing unit 60 may be also realized with a data server 60 communicating with the own vehicle outside the own vehicle as illustrated in FIG. 5.

In this case, the interface unit 10, the positioning unit 20, the map data storage unit 30, the sensor unit 40, the control unit 50, and the autonomous driving unit 70 are mounted in the own vehicle. The data server communicates with the own vehicle in the outside of the own vehicle, and the communication unit 80 for communicating with the own vehicle and the data server 60 may be mounted in the own vehicle. The communication unit 80 may perform vehicle-to-vehicle (V2V) and vehicle-to-infrastructure (V2I) communication with an external vehicle/infrastructure 90 as well as with the data server 60. Up-to-dateness of the map data stored in the map data storage unit 30 may be maintained by updating the map data with new map data provided from the infrastructure outside the own vehicle.

Embodiment 2

Figure 6:
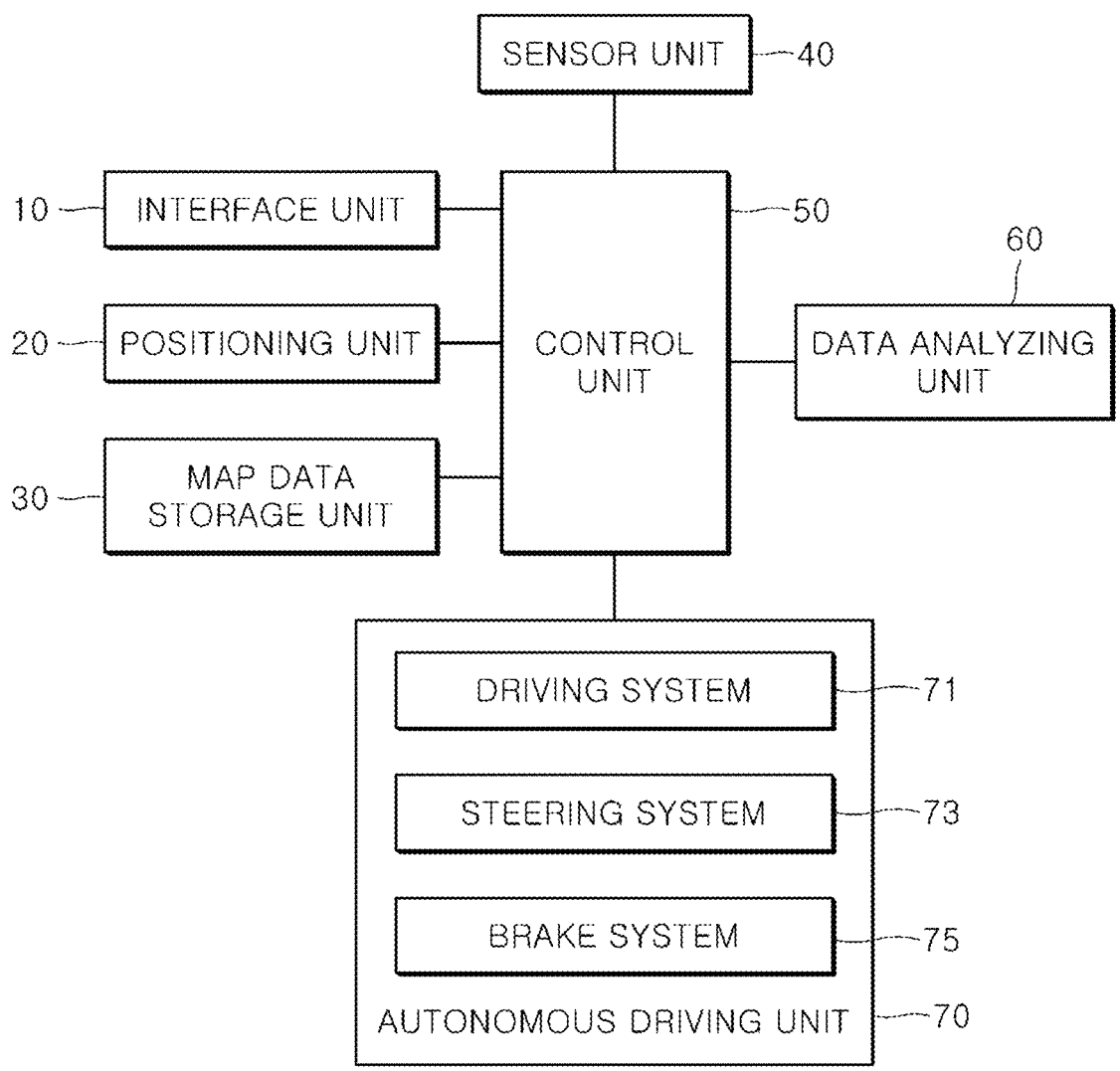
FIG. 6 is a block configuration diagram for describing an autonomous driving control device according to a second embodiment of the invention.
Figure 7:
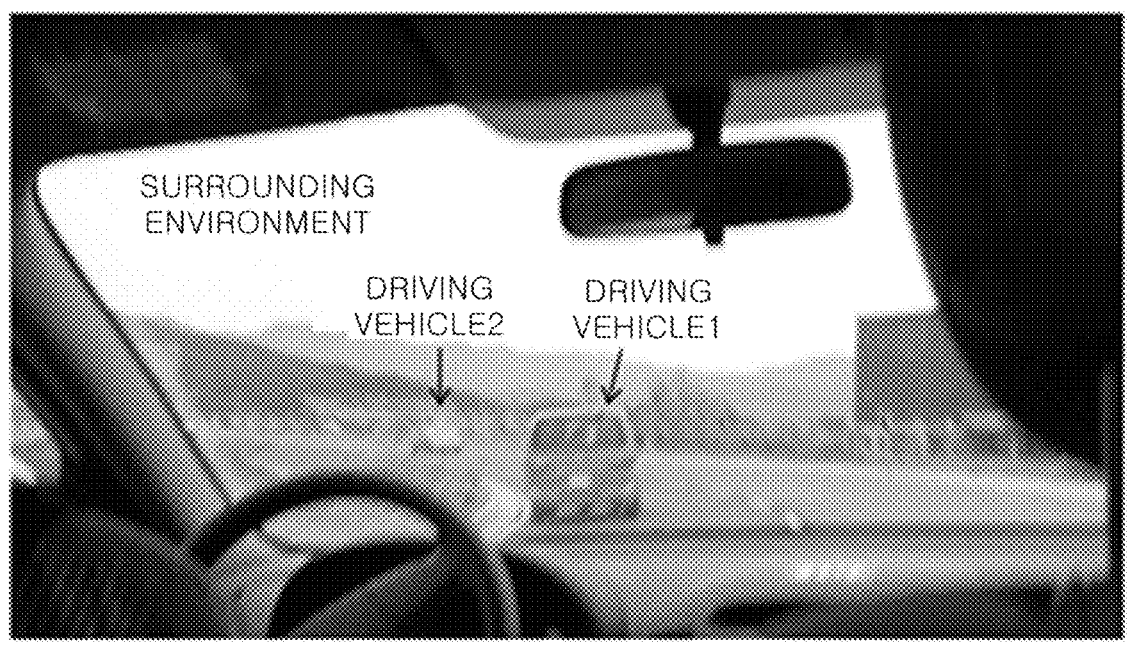
FIGS. 7 and 8 are exemplary drawings for describing a process in which a sensor unit senses a surrounding object and a surrounding environment in the autonomous driving control device according to the second embodiment of the invention.
Figure 8:
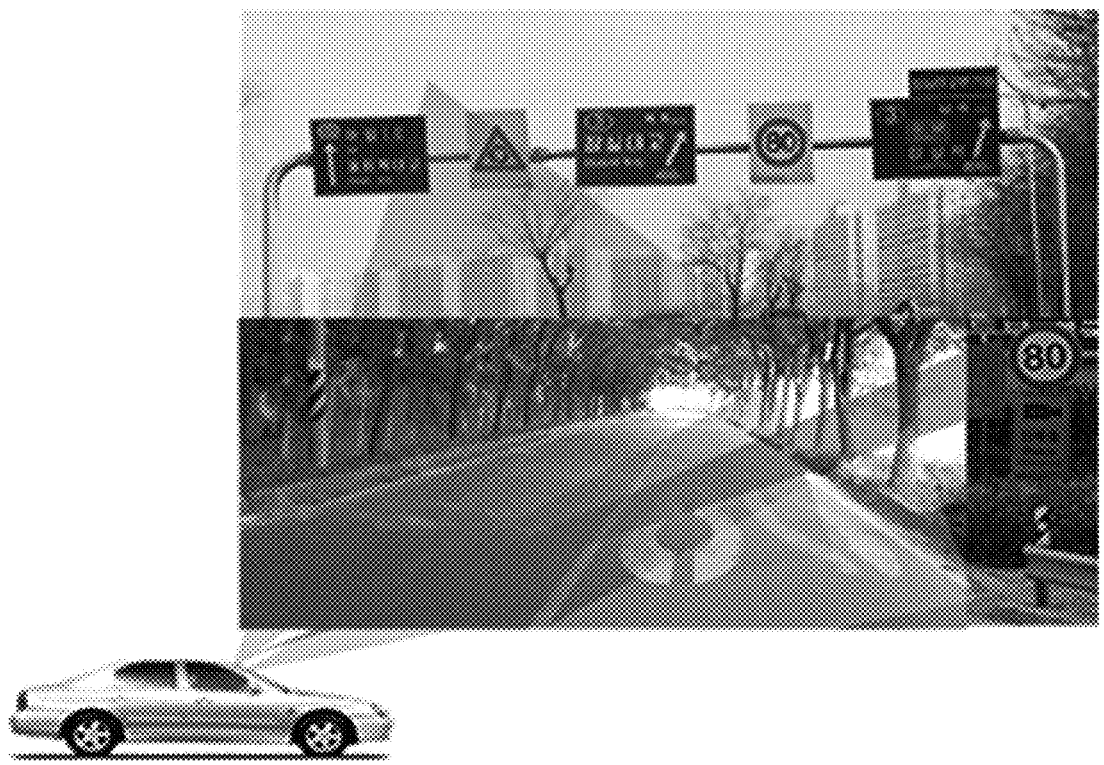
Figure 9:
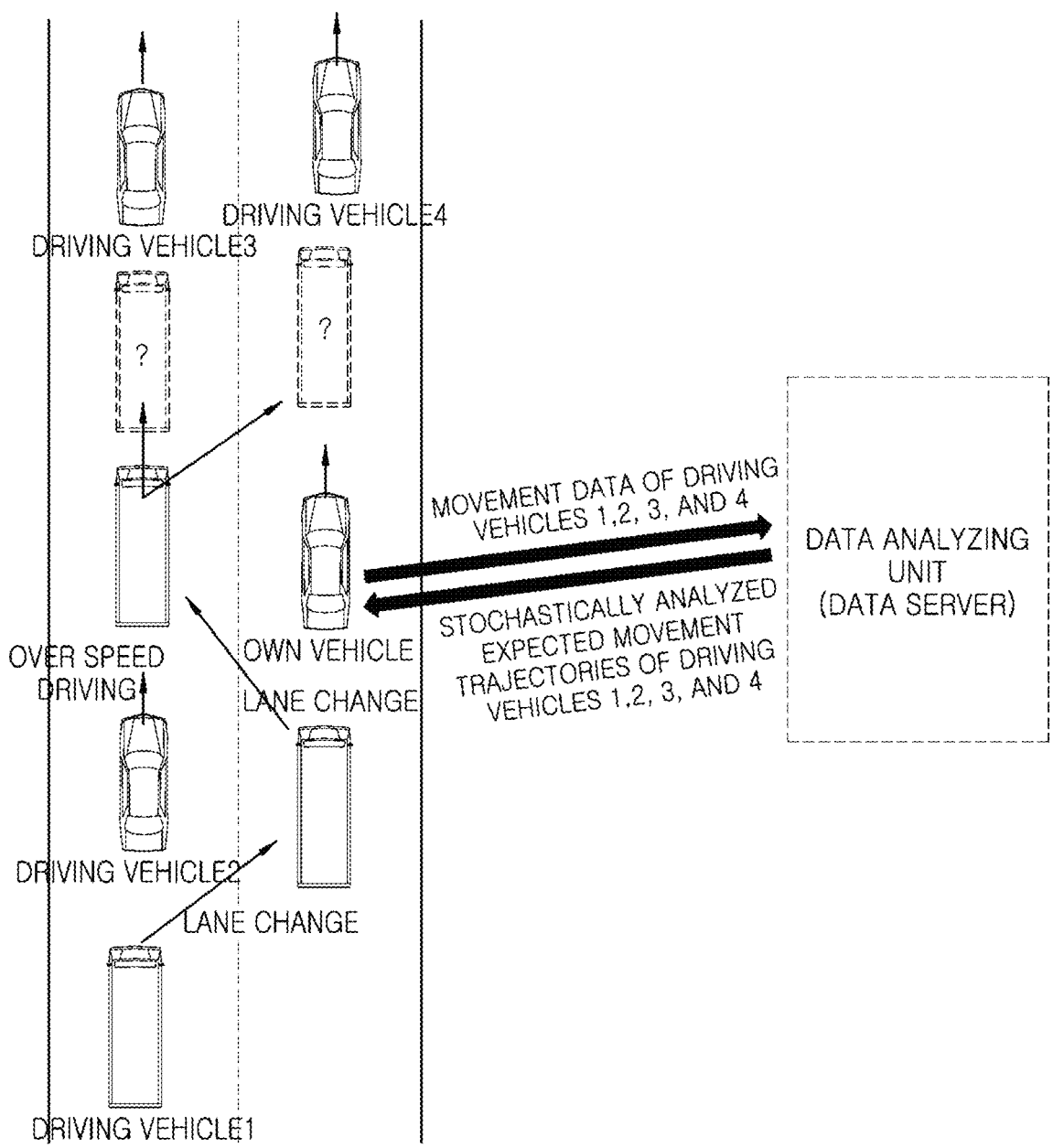
FIGS. 9 and 10 are exemplary drawings for describing a process in which a data analyzing unit analyzes movement data of the surrounding object in the autonomous driving control device according to the second embodiment of the invention.
Figure 10:
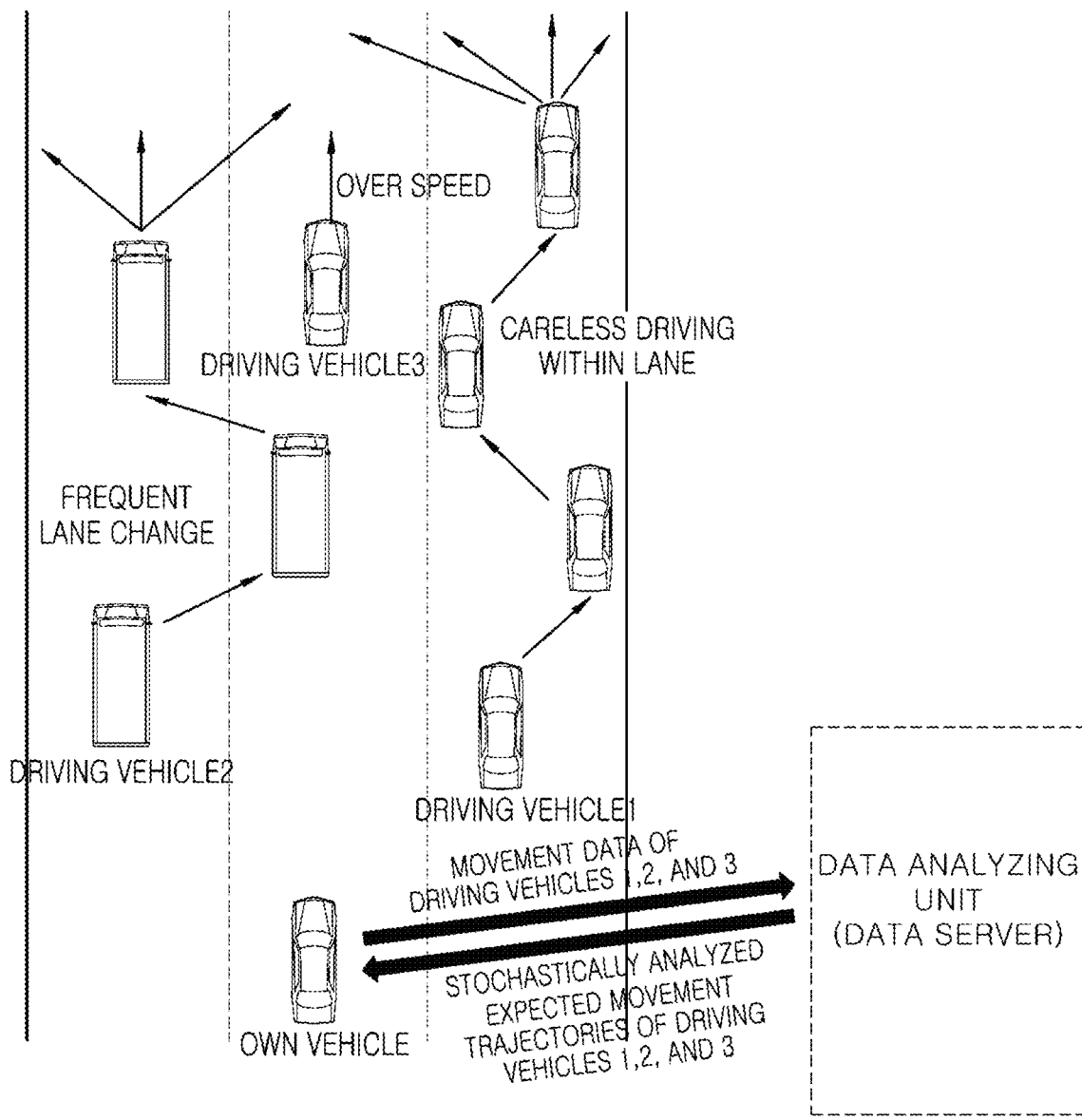
Figure 11:
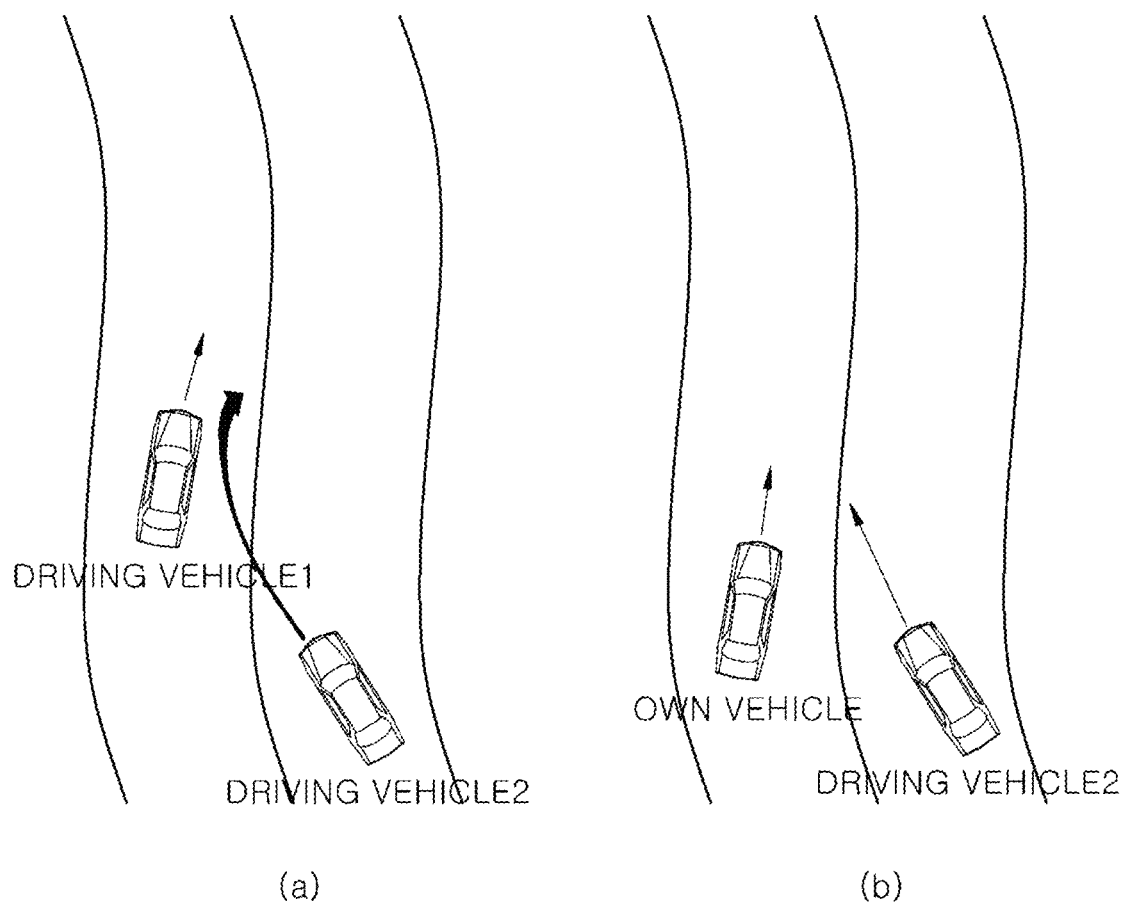
FIGS. 11 and 12 are exemplary drawings for describing a process in which a collision with a surrounding object is avoided through accident data analyzed by the data analyzing unit in the autonomous driving control device according to the second embodiment of the invention.
Figure 12:
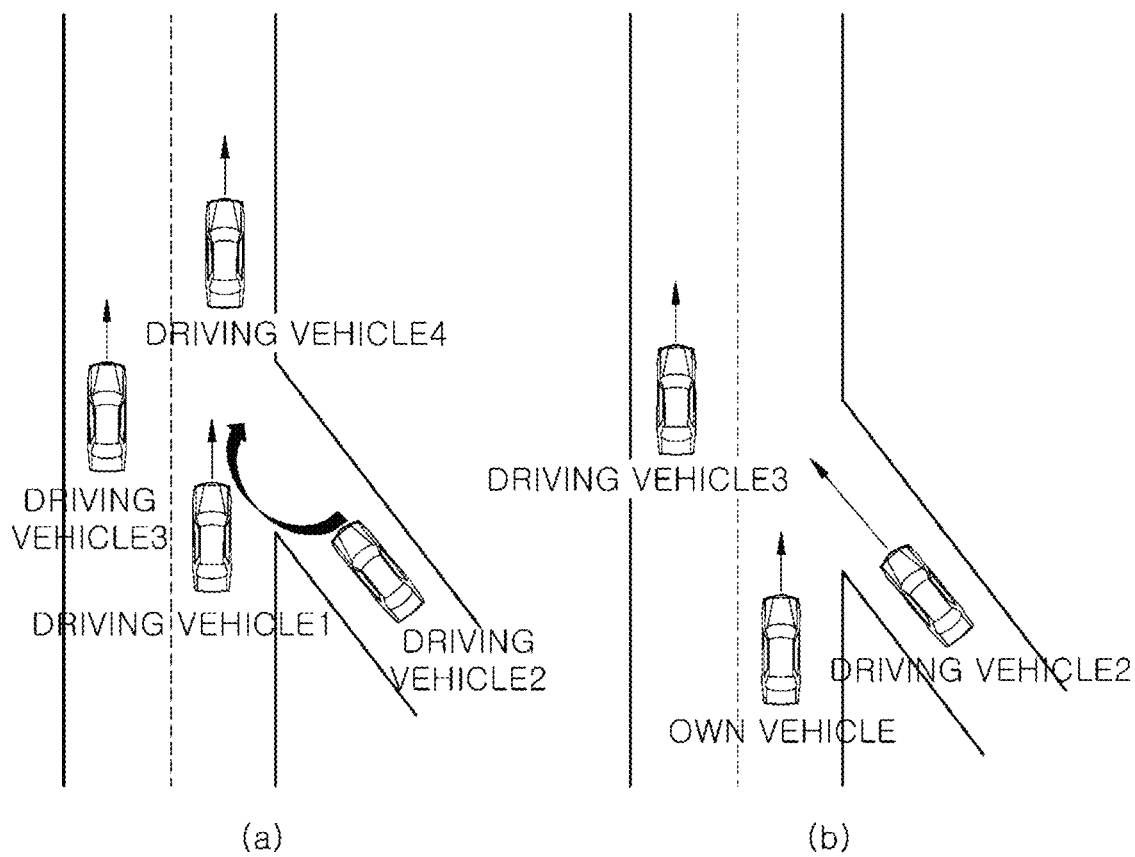

FIG. 6 is a block configuration diagram for describing an autonomous driving control device according to a second embodiment of the invention, and FIGS. 7 and 8 are exemplary drawings for describing a process in which a sensor unit senses a surrounding object and a surrounding environment in the autonomous driving control device according to the second embodiment of the invention. FIGS. 9 and 10 are exemplary drawings for describing a process in which a data analyzing unit analyzes movement data of the surrounding object in the autonomous driving control device according to the second embodiment of the invention, and FIGS. 11 and 12 are exemplary drawings for describing a process in which a collision with the surrounding object is avoided through accident data analyzed by the data analyzing unit in the autonomous driving control device according to the second embodiment of the invention.

In relation to FIG. 6, the autonomous driving control device according to the second embodiment of the invention may include an interface unit 10, a positioning unit 20, a map data storage unit 30, a sensor unit 40, a control unit 50, a data analyzing unit 60, and an autonomous driving unit 70.

In the second embodiment, the interface unit 10, the positioning unit 20, the map data storage unit 30, and the autonomous driving unit 70 have the same configurations as those in FIG. 1, and thus, the second embodiment will be described mainly about the sensor unit 40, the control unit 50, and the data analyzing unit 60 that have differences with those in the first embodiment.

The sensor unit 40 may sense the surrounding object and the driving environment of the own vehicle to deliver the sensed result to the control unit 50 to be described later. The sensor unit 40 may include all kinds of sensors mounted in the vehicle, and may include a camera sensor, a radar sensor, a lidar sensor, or an ultrasonic sensor, etc., for detecting the surrounding object and the driving environment of the own vehicle. FIGS. 7 and 8 illustrate a process in which the sensor unit 40 senses the surrounding object and the driving environment.

When receiving a destination from a user through the interface unit 10, the control unit 50 generates a path from a current position to the destination based on the current position of the own vehicle measured by the positioning unit 20 and the map data stored in the map data storage unit 30, and controls the autonomous driving unit 70 to perform autonomous driving of the own vehicle, while following the generated path.

The control unit 50 in an embodiment may generate an autonomous driving path of the own vehicle based on movement data of the surrounding object sensed by the sensor unit 40.

Here, the surrounding object includes all objects moving in the surroundings such as a pedestrian, a bicycle, or an autobike as well as surrounding vehicles in the surrounding of the own vehicle. In addition, the movement data of the surrounding objects means object attribute data including one or more of an object type (an object type such as a car, a truck, a bus, a pedestrian, a bicycle, or an autobike), a movement speed, acceleration/deceleration information, lane change frequency information and lane compliance information.

In addition, the driving environment information may include one or more of driving road information, driving area information, and driving time information of the own vehicle. In detail, the driving road information may include information on the road width, the number of lanes, the lane grade, the lane curvature, a road type, whether the road is paved, whether the road has a tunnel, whether the road has a merging area, or a road sign. The surrounding area information may include information on the surrounding natural environment such as a downtown, a suburb, or a mountain/river, and the driving time information may include information such as a time, a date, a season, or a position of the sun.

In other words, the control unit 50 may perform the autonomous driving of the own vehicle through a manner in which an autonomous driving path is generated in real time in order to avoid a collision with the surrounding object in the corresponding driving environment, while monitoring the surrounding object of the own vehicle through the sensor unit 40 during following the path to the destination.

However, when the autonomous driving is performed only based on the sensor mounted in the vehicle as described above, there is a limitation in that preciseness of the autonomous driving is lowered due to systematic limitation of the sensor device. Thus, the embodiment adopts a configuration for improving preciseness of autonomous driving by stochastically analyzing an expected movement trajectory of the surrounding object through the surrounding object analyzing unit 60, and reflecting the analyzed result to generating the autonomous driving path of the own vehicle.

The data analyzing unit 60 may receive the movement data of the surrounding object from the control unit 50 and stochastically analyze the expected movement trajectory of the surrounding object. At this point, the data analyzing unit 60 may receive the movement data of the surrounding object to stochastically analyze the expected movement trajectory of the surrounding object based on pre-stored big data to which reference information of the movement data is reflected according to the attributes of the object.

In detail, as described above, the movement data of the surrounding object received by analyzing unit 60 from the control unit 50 includes one or more of the object type, the movement speed, the acceleration/deceleration information, the lane change frequency information and the lane compliance information. In relation to the example illustrated in FIG. 9, the surrounding object analyzing unit 60 may determine a driving vehicle 1 to be a vehicle frequently changing a lane based on movement data thereof, determine a driving vehicle 2 to be a low speed driving vehicle based on movement data thereof, and determine driving vehicles 3 and 4 to be vehicles moving in front of the own vehicle at a regular speed based on movement data thereof. Similarly, in relation to the example illustrated in FIG. 10, the surrounding object analyzing unit 60 may determine the driving vehicle 1 to be a vehicle driven carelessly within a lane based on movement data thereof, determine the driving vehicle 2 to be a vehicle frequently changing lane based on movement data thereof, and determine the driving vehicle 3 to be a high speed driving vehicle in the front of the own vehicle based on movement data thereof.

Accordingly, the data analyzing unit 60 may stochastically analyze the expected movement trajectory of the surrounding object based on the movement data of the surrounding object received from the control unit 50, and at this point, the data analyzing unit 60 may stochastically analyze the expected movement trajectory of the surrounding object based on pre-stored big data to which reference information of the movement data is reflected according to the attributes of the object. The big data means a database of the reference information in which movement data is collected according to attributes of the object (namely, an object type, a movement speed, acceleration/deceleration information, lane change frequency information and lane compliance information). The movement trajectory of the corresponding surrounding object is predicted from the movement data of the surrounding object in the database. Accordingly, the data analyzing unit 60 may apply a stochastic analysis scheme using the big data to the movement data of the surrounding object to stochastically analyze the expected movement trajectory.

On the other hand, in consideration of a calculation load of the big data-based stochastic analysis scheme, the surrounding object analyzing unit 60 may be also realized with a data server 60 communicating with the own vehicle in the outside of the own vehicle as illustrated in FIGS. 9 and 10.

In addition, the data analyzing unit 60 may analyze accident data corresponding to the driving environment information received from the control unit 50. In addition, the data analyzing unit 60 may analyze the accident data corresponding to the driving environment information received from the control unit 50 based on pre-stored big data to which the accident data for each driving environment is reflected.

In detail, as described above, the driving environment information received by the data analyzing unit 60 from the control unit 50 includes one or more of driving road information, driving area information, and driving time information. In an example illustrated in FIG. 11, when the own vehicle is following a curved road, the data analyzing unit 60 may extract accident data on the curved road as shown in FIG. 11A from the big data based on the driving environment information received from the control unit 50, and accordingly, the own vehicle may generate the autonomous driving path as shown in FIG. 11B to avoid a collision with a driving vehicle 1. In addition, in an example illustrated in FIG. 12, when the own vehicle is driving a complicated merging area, the data analyzing unit 60 may extract accident data on the merging area as shown in FIG. 12A from the big data based on the driving environment information received from the control unit 50, and accordingly, the own vehicle may generate the autonomous driving path as shown in FIG. 12B to avoid a collision with a driving vehicle 1.

In addition, the data analyzing unit 60 may extract, from the big data, the accident data corresponding to the driving environment information received from the control unit 50. The big data means a database of reference information from which accident data for each driving environment is collected to predict a possible accident in the driving environment of the own vehicle. Accordingly, the data analyzing unit 60 may extract the accident data corresponding to the driving environment information through a similarity analysis between the driving environment information received from the control unit 50 and the accident data for each driving environment collected in the big data, and may deliver the extracted accident data to the control unit 50.

To sum up, the big data of the data analyzing unit 60 functions as the database of the reference information from which the movement data is collected according to the attributes of the object to predict the movement trajectory of the surrounding object, and functions as the database for the reference information from which the accident data is collected for each driving environment to predict the possible accident in the driving environment of the own vehicle. The data analyzing unit 60 may enable the control unit to optimize the autonomous driving path by analyzing the accident data corresponding to the expected movement trajectory and driving environment information of the surrounding object through the big data and by delivering the analyzed result to the control unit 50.

The control unit 50 may finally determine the expected movement path of the surrounding object based on the movement data and expected movement trajectory of the surrounding object, and may optimize the autonomous driving path by reflecting the accident data analyzed by the data analyzing unit 60 to the expected movement path of the surrounding object.

In other words, the control unit 50 may predict possibility of accident occurrence in a current driving environment of the own vehicle to optimize the autonomous driving path so as to avoid a collision with the surrounding object by finally determining the expected movement path of the surrounding object based on the movement data of the surrounding object currently monitored in real time through the sensor unit 40 and the expected movement trajectory of the surrounding object stochastically analyzed by the surrounding object analyzing unit 60, and by reflecting the accident data analyzed by the data analyzing unit 60 to the expected movement path of the surrounding object.

The autonomous driving unit 70 may perform one or more of driving, steering and braking of the own vehicle so as to follow the autonomous driving path optimized through the above-described process. In other words, the autonomous driving unit 70 may be controlled to perform one or more of driving, steering and braking of the own vehicle, so as to follow the generated (updated) autonomous driving path by the control unit 50. To this end, as illustrated in FIG. 1, the autonomous driving unit 70 may include a driving system 71 for driving an internal combustion engine, a steering system 73 such as MDPS, AFS, or RWS, a brake system 75 such as AEB or ABS.

Figure 13:
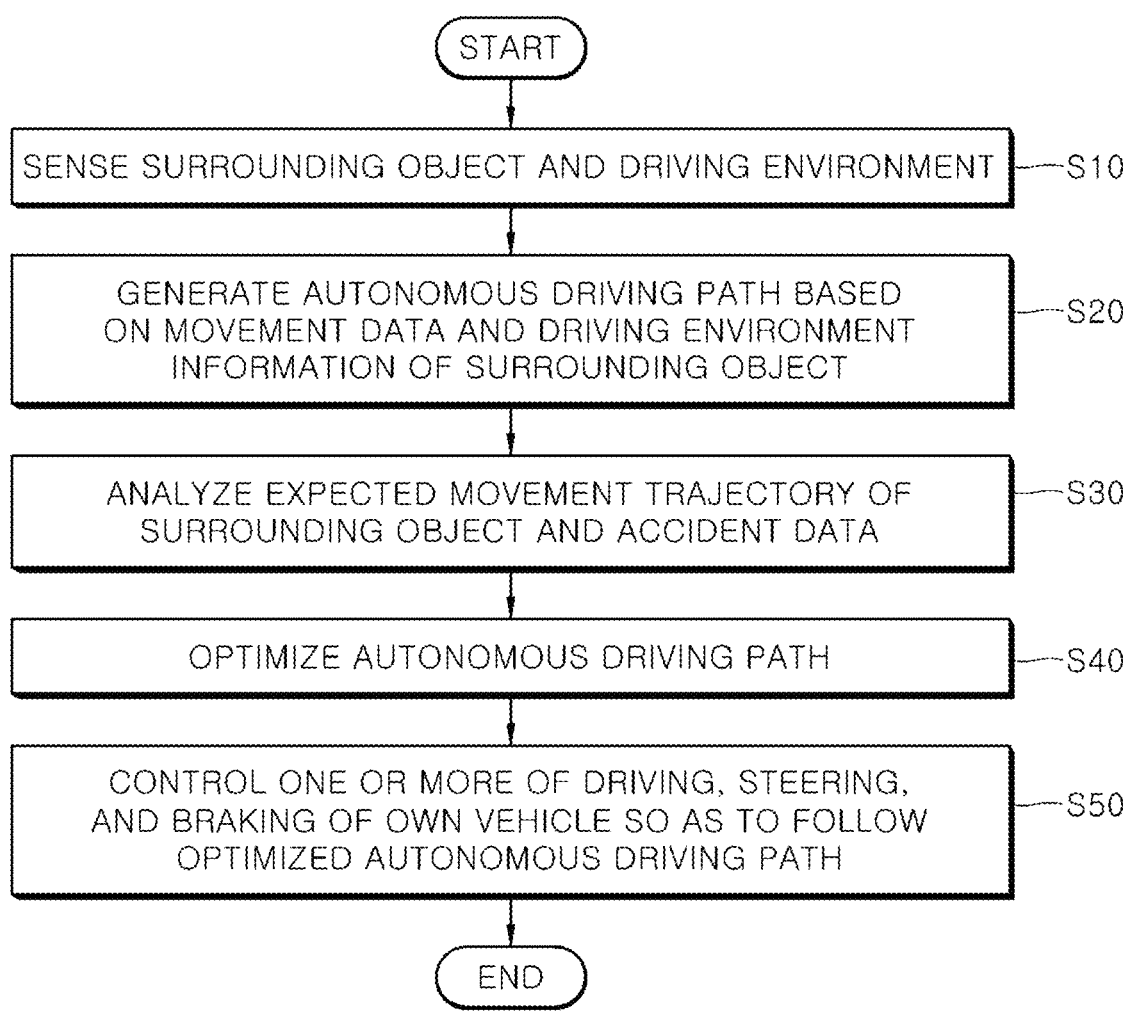
FIG. 13 is a flowchart for describing an autonomous driving method according to a second embodiment of the invention.

FIG. 13 is a flowchart for describing an autonomous driving method according to a second embodiment of the invention.

In description about the autonomous driving method according to an embodiment of the invention in relation to FIG. 13, the sensing unit 40 senses the surrounding object and driving environment of the own vehicle (operation S10). The sensing unit 40 may sense the surrounding object and driving environment of the own vehicle through a camera sensor, a radar sensor, a lidar sensor, or an ultrasonic sensor, etc., mounted in the vehicle.

Then, the control unit 50 may generate an autonomous driving path of the own vehicle based on movement data and driving environment information of the surrounding object that is sensed by the sensor unit 40. Here, the movement data of the surrounding object means attribute data of an object including one or more of an object type, a movement speed, acceleration/deceleration information, lane change frequency information and lane compliance information, and the driving environment information may include one or more of driving road information, driving area information, and driving time information on the own vehicle.

Then, the surrounding object analyzing unit 60 may receive the movement data of the surrounding object from the control unit 50 to stochastically analyze an expected movement trajectory of the surrounding object, stochastically analyze the expected movement trajectory of the surrounding object, and may analyze the accident data corresponding to the driving environment information received from the control unit 50 (operation S30). In operation S30, the data analyzing unit 60 may receive the movement data of the surrounding object to stochastically analyze the expected movement trajectory of the surrounding object based on the pre-stored big data to which movement data reference information according to the object attributes is reflected, and may analyze the accident data corresponding to the driving environment information received from the control unit 50 based on the pre-stored big data to which the accident data for each surrounding environment is reflected.

Then, the control unit 50 may optimize the autonomous driving path based on the expected movement trajectory and the accident data of the surrounding object that are analyzed by the data analyzing unit 60 (operation S40). In operation S40, the control unit 50 may finally determine the expected movement path of the surrounding object based on the movement data and the expected movement trajectory of the surrounding object, and optimize the autonomous driving path by reflecting the accident data analyzed by the data analyzing unit 60 to the expected movement path of the surrounding object.

Then, the control unit 50 controls one or more of driving, steering and braking of the own vehicle so that the own vehicle follows the autonomous driving path optimized in operation S40 (operation S50).

Figure 14:
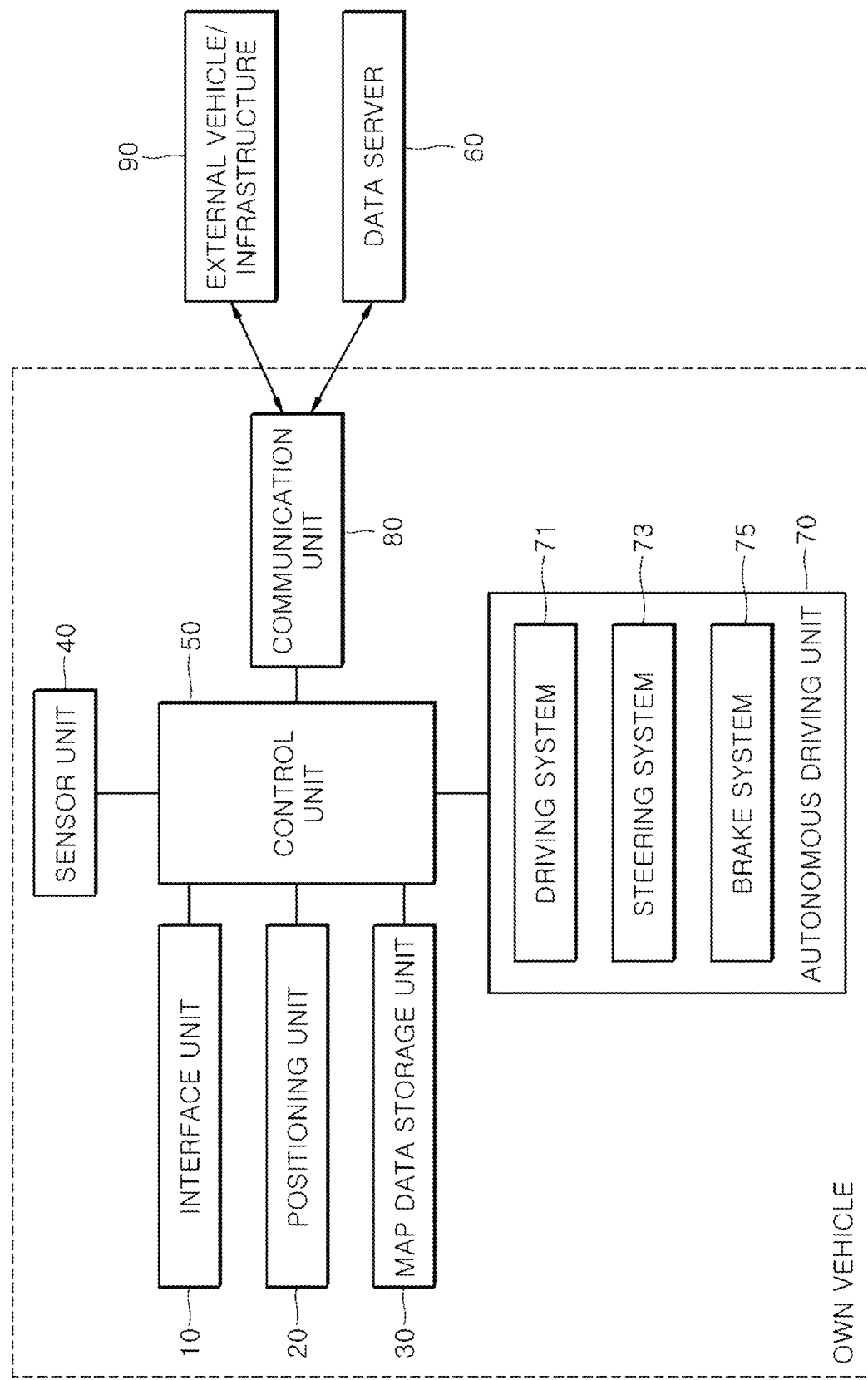
FIG. 14 is a block configuration diagram for describing an autonomous driving system according to a second embodiment of the invention.

On the other hand, in consideration of a calculation load of the big data-based calculation, the data analyzing unit 60 may be also realized with a data server 60 communicating with the own vehicle in the outside of the own vehicle as illustrated in FIG. 14.

In this case, the interface unit 10, the positioning unit 20, the map data storage unit 30, the sensor unit 40, the control unit 50, and the autonomous driving unit 70 are mounted in the own vehicle. The data server communicates with the own vehicle outside the own vehicle, and the communication unit 80 for communicating with the own vehicle and the data server 60 may be mounted in the own vehicle. The communication unit 80 may perform vehicle-to-vehicle (V2V) and vehicle-to-infrastructure (V2I) communication with an external vehicle/infrastructure 90 as well as the data server 60. Up-to-dateness of map data stored in the map data storage unit 30 may be maintained by updating the map data with new map data provided from the infrastructure outside the own vehicle.

In this way, in accordance with the embodiments, the limit of an existing sensor-based autonomous driving control may be overcome, and the autonomous driving control performance may be improved by generating the autonomous driving path to perform the autonomous driving in consideration of the expected movement trajectory of the surrounding vehicle that is analyzed through the data server, together with the sensor data measured through the vehicle-mounted sensor.

In accordance with the embodiments, a limit of an existing sensor-based autonomous driving control may be overcome to improve autonomous driving control performance by generating an autonomous driving path to perform autonomous driving in consideration of an expected movement trajectory of a surrounding vehicle, which is analyzed through a data server, together with the sensor data measured through a vehicle-mounted sensor.

Therefore, it should be understood that since the configurations of the embodiments and drawings described herein are merely exemplary embodiments of the invention, but do not include all the technical spirits of the invention, there may be provided various equivalents and modifications which can be substituted for the above configurations. Therefore, it will be readily understood by those skilled in the art that various modifications and changes can be made thereto without departing from the spirit and scope of the invention defined by the appended claims and their equivalents.

Although exemplary embodiments of the disclosure have been shown and described hereinabove, the disclosure is not limited to specific exemplary embodiments described above, but may be various modified by those skilled in the art to which the disclosure pertains without departing from the scope and spirit of the disclosure as disclosed in the accompanying claims. In addition, such modifications should also be understood to fall within the scope and spirit of the disclosure.

What is claimed is:

1. An autonomous driving device of a vehicle comprising:
   a sensor configured to sense a surrounding object near the vehicle and a driving environment information of the vehicle;
   a controller disposed in the vehicle and configured to generate an autonomous driving path of the vehicle based on movement data and driving environment information of the surrounding object generated by the sensor; and
   a data analyzer configured to stochastically analyze an expected movement trajectory of the surrounding object based on the movement data of the surrounding object that is received from the controller, and to analyze accident data corresponding to the driving environment information received from the controller,
   wherein:
   the controller is configured to optimize the autonomous driving path based on the stochastically analyzed expected movement trajectory of the surrounding object and the analyzed accident data;
   the accident data corresponding to the driving environment information received from the controller is past accident data extracted from pre-stored big data for each driving environment;
   the controller is configured to determine an expected movement path of the surrounding object based on the movement data of the surrounding object and the expected movement trajectory of the surrounding object, and to optimize the autonomous driving path by reflecting the accident data in determining the expected movement trajectory of the surrounding object,
   wherein the data analyzer is disposed outside the vehicle and realized with a data server communicating with the controller of the vehicle, so that a calculation load of the big data-based stochastic analysis scheme of the controller can be removed.

2. The autonomous driving device according to claim 1, wherein the driving environment information comprises one or more of driving road information, driving area information, and driving time information of the vehicle.

3. An autonomous driving method of a vehicle comprising the steps of:
   sensing, by a sensor, a surrounding object and a driving environment of the vehicle;
   generating, by a controller disposed in the vehicle, an autonomous driving path for the vehicle based on movement data and driving environment information of the surrounding object generated by the sensor;
   receiving, by a data analyzer, the movement data of the surrounding object from the controller, stochastically analyzing an expected movement trajectory of the surrounding object, and analyzing an accident data corresponding to the driving environment information; and
   optimizing, by the controller, the autonomous driving path based on the stochastically analyzed expected movement trajectory of the surrounding object and the analyzed accident data,
   wherein:
   the accident data corresponding to the driving environment information received from the controller is past accident data extracted from pre-stored big data for each driving environment; and
   in the step of optimizing, the controller is configured to determine an expected movement path of the surrounding object based on the movement data of the surrounding object and the expected movement trajectory of the surrounding object, and to optimize the autonomous driving path by reflecting the accident data analyzed by the data analyzer to determine the expected movement trajectory of the surrounding object,
   wherein the data analyzer is disposed outside the vehicle and realized with a data server communicating with the controller of the vehicle, so that a calculation load of the big data-based stochastic analysis scheme of the controller can be removed.

4. The autonomous driving method according to claim 3, wherein the driving environment information comprises one or more of driving road information, driving area information, and driving time information of the vehicle.

* * * * *